United States Patent [19]
Hanano

[11] Patent Number: 4,739,933
[45] Date of Patent: Apr. 26, 1988

[54] SPRAY SYSTEM

[75] Inventor: Takashi Hanano, Kobe, Japan

[73] Assignee: Hanano Syoji Kabushiki Kaisha, Hyogo, Japan

[21] Appl. No.: 947,300

[22] Filed: Dec. 29, 1986

[30] Foreign Application Priority Data

Nov. 13, 1986 [JP] Japan .................. 61-270400

[51] Int. Cl.⁴ .............. A62C 13/60; A62C 11/06; A62C 31/02; B05B 1/14
[52] U.S. Cl. .................. 239/304; 239/335; 239/397; 239/560
[58] Field of Search ........... 239/304, 335, 397, 442, 239/548, 549, 556, 560, 561, 565

[56] References Cited

U.S. PATENT DOCUMENTS

| | | | |
|---|---|---|---|
| 2,954,936 | 10/1960 | Shames et al. | 239/442 X |
| 3,347,473 | 10/1967 | Steck | 239/565 X |
| 4,006,703 | 2/1977 | Smith | 239/335 X |
| 4,247,047 | 1/1981 | Schaming | 239/556 X |

FOREIGN PATENT DOCUMENTS 999898  11/1976  Canada .................. 239/556

Primary Examiner—George E. A. Halvosa
Assistant Examiner—Patrick N. Burkhart
Attorney, Agent, or Firm—Armstrong, Nikaido, Marmelstein & Kubovcik

[57] ABSTRACT

A spray system, including a nozzle unit composed of a pair of plates facing each other, plural spraying nozzles provided on the plates and a distribution manifold having plural chambers. A branch outlet of each chamber is interconnected to a spraying nozzle through a tube. A plurality of atomizers are mounted on a manifold base supported by a supporting member. The nozzle unit is held by jointing the manifold to the manifold base through a joint in a detachable manner. Different kinds of mold release agents, and an antiseize device or water is supplied to each atomizer and each atomizer is connected to a corresponding chamber.

6 Claims, 4 Drawing Sheets

SPRAY SYSTEM

BACKGROUND OF THE INVENTION

1. Field of Application

This invention relates to a spray system for a mold release agent etc. and, more particularly, for use when spraying a mold release agent on an internal mold surface of a die casting machine.

2. Prior Art

Generally, the spraying direction and the quantity of material provided by a spray system are predetermined according to the shape of mold so the spraying direction and quantity of material are readjusted when changing the mold. In a conventional spray system, however, many spraying nozzles are held by a complicated holding mechanism consisting of a stand etc. so that the above-mentioned readjusting work is very difficult to be done. Further, since it is now possible to exchange the mold itself within a short time, there is also a strong demand for shortening the work time required for adjusting the nozzles.

Moreover, since temperature differentials are generally produced on the mold internal surface due to the difference in shape of each part etc., it is necessary to spray a mold release agent or water suitable for each part in order to positively improve product quality and avoid seizure.

However, since the conventional spray system is so constructed as to spray only one kind of mold release agent for each process, the above-mentioned requirement can not be satisfied.

OBJECT OF THE INVENTION

An object of the present invention is to simplify the nozzle adjustment work at the time of exchanging a mold by incorporating many spraying nozzles into one block to enable the exchange of nozzles in the form of one complete unit, and further to shorten the spraying time and improve product quality by permitting different kinds of mold release agent or water to be sprayed simultaneously.

SUMMARY OF THE INVENTION

In order to accomplish the above object in this invention, the nozzle unit is composed of a pair of plates facing each other, plural spraying nozzles are provided on the plates and a distribution manifold having plural chambers with a branch outlet for each chamber are interconnected to the spraying nozzles through a tube. Plural atomizers are mounted on a manifold base supported by a supporting member other than that of the nozzle unit. The nozzle unit is held by coupling the manifold to the manifold base through a coupling in a detachable manner. Respective different kinds of mold release agents, an antiseize device or water are supplied to each atomizer and each atomizer is interconnected to a corresponding chamber.

DETAILED DESCRIPTION OF THE INVENTION

Figure 1:
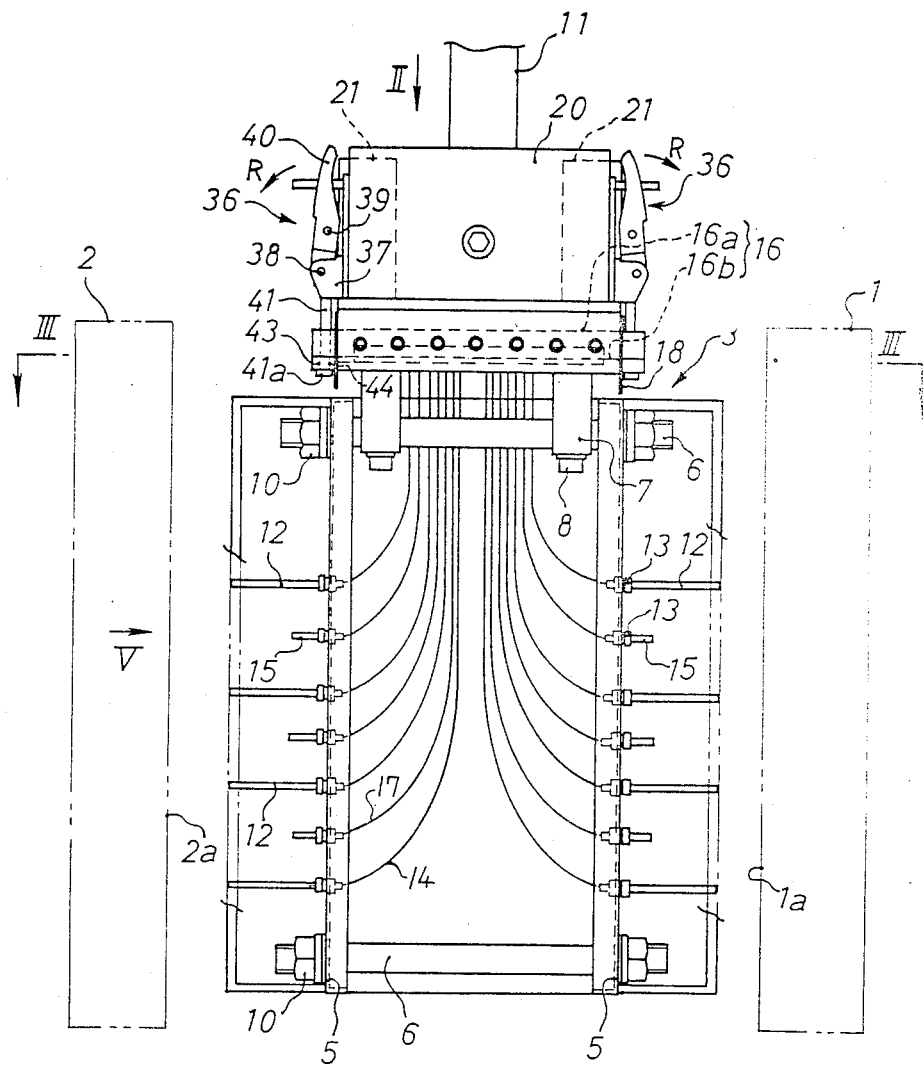
FIG. 1 is an elevation view of a mold release agent spray system according to the present invention.
Figure 2:
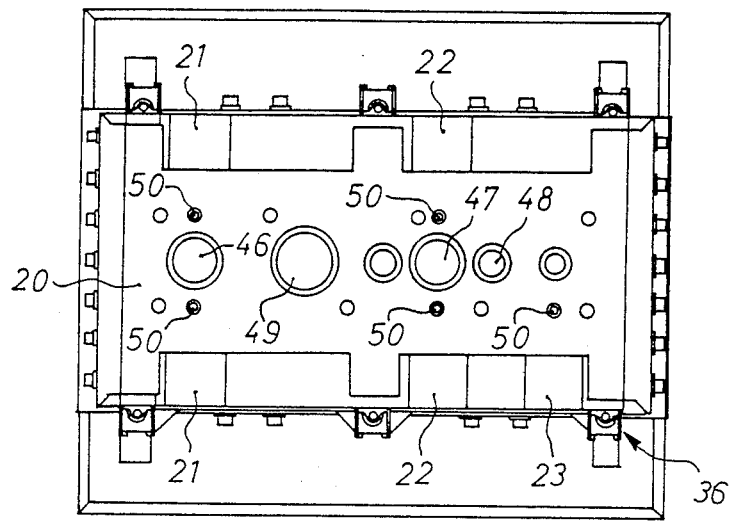
FIG. 2 is a top view taken in the direction of arrow II of FIG. 1.

FIG. 1 shows the elevation view of the mold release agent spray system according to the present invention. In FIG. 1, 1 and 2 are a fixed mold and a movable mold of a die casting machine respectively, the molds being spaced apart from each other as shown by the figure, and a nozzle unit 3 of the spray system descends between the molds 1 and 2 at the time when a first die casting process is completed. The nozzle unit is composed of a pair of vertical plates 5 and 5 facing each other, many spraying nozzles 12 for mold release agent etc., air nozzles 15 and a distribution manifold 16 etc. Peripheral edges of the plates 5 and 5 are integrally tightened by means of plural horizontal set bolts 6 and 6 and nuts 10 and 10 etc. The distribution manifold 16 is composed of an upper member 16a and a lower member 16b fastened together, disposed at an upper part of the plates 5 and 5, and provided integrally with plural brackets 7. The upper set bolt 6 is passed through the brackets 7 which are integrally fastened to the set bolt 6 by cap screws 8.

The spraying nozzle 12 and the air nozzle 15 provided on the plates 5 and 5 are of a fixed type, for example, wherein they are inserted in many attaching holes (not shown) made on the plates 5 and 5 projectingly from insides of plates (between the both plates) toward outsides thereof, and tightened thereto by nuts 13. Tip ends of the nozzle 12 and the nozzle 15 open to an internal surface of an adjacent mold (in a direction opposite to the other plate), and their base ends are connected to the ends of a tube 14 and a tube 17 made of plastic resin etc. The other ends of the tubes 14 and 17 are connected to mold release agent outlets at a lower face of the manifold as described later.

A manifold base 20 is disposed at an upper side of the manifold 16, and an upper end of the manifold base 20 is fastened to a rod portion of an elevating cylinder unit 11. The base 20 is clamped to an upper face of the manifold 16 by means of plural pull clamp mechanisms 36 in a detachable manner, thereby holding the entire nozzle unit 3.

The clamp mechanism 36 is composed, for example, of a lever holder 37, a lever 40 and a pull rod 41. The holder 37 is fastened to a side face of the base 20, and the lever 40 is rotatably supported by the holder 37 through a horizontal shaft 38. The pull rod 41 is rotatably supported by the lever 40 through a horizontal pin 39 at a position eccentric from the shaft 38. The rod 41 extends downward and fits in a groove 44 of a flange 43 of the manifold 16, and a bottom head 41a engages with the flange 43.

Plural first, second and third atomizers 21, 22 and 23 are provided on the base 20 as shown in FIG. 2. Respective atomizers 21, 22 and 23 are individually connected to different kinds of mold release agent supply sources or a antiseize device supply source, or a water supply source and they are also individually connected to air supply sources through air inlets 46, 47 and 48 for respective atomizers 21, 22 and 23 respectively so as to mix mold release agents (or antiseize device etc.) from both supply sources with air to form a mold-release-agent/air mixture. The first atomizer 21 is connected, for example, to a mold release agent supply source for high viscosity and high temperature, the second atomizer 22 is connected to a mold release agent supply source for comparatively low viscosity and low temperature, and the third atomizer 23 is connected to an antiseize device supply source or to a water supply source. Further, the head 20 is provided with an air inlet 49 for spraying air and the air inlet 49 is connected to the air supply source.

Although not shown by the drawings, the head 20 is also provided with change-over valves and timers for controlling spraying quantity and spraying time which are disposed on each of the atomizers 21, 22 and 23, and the atomizers are actuated by said change-over valves and air in an air circuit for operating the valves.

Figure 3:
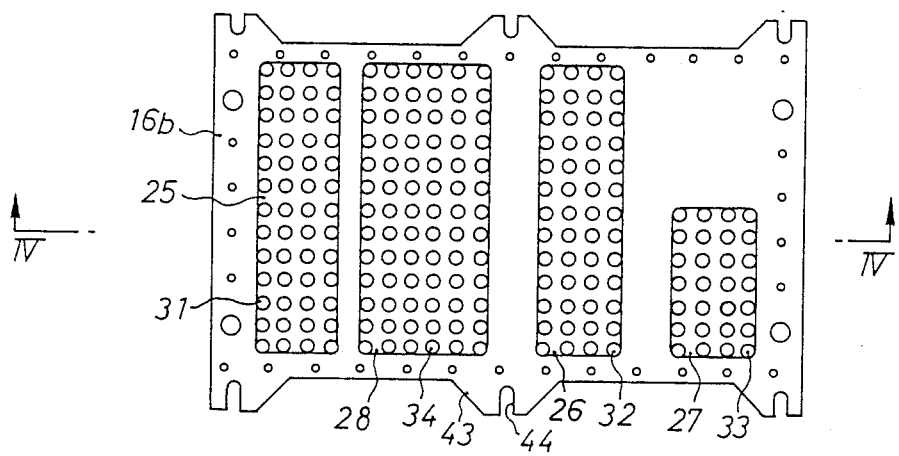
FIG. 3 is an enlarged sectional view taken on a line III—III of FIG. 1.

On the other hand, a first mold release agent's first chamber 25, a second mold release agent's second chamber 26, an antiseize device's third chamber 27 and an air blowing chamber 28 are installed in the distribution manifold 16 as shown in FIG. 3. The first, second and third chambers 25, 26 and 27 are interconnected to the first, second and third atomizers 21, 22 and 23 respectively and individually. The air blowing chamber 28 is interconnected to the air blowing inlet 49. Many branch outlets 31, 32, 33 and 34 are formed on lower faces of the chambers 25, 26 and 27 and the air blowing chamber 28 respectively.

Figure 4:
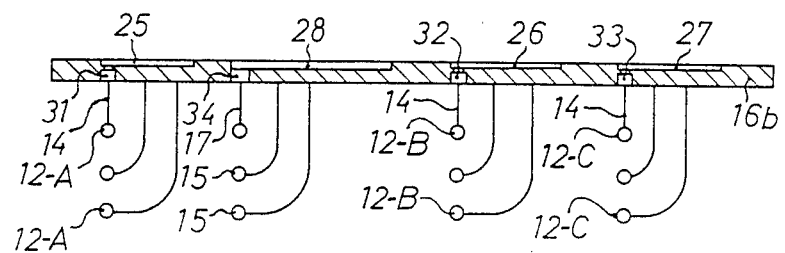
FIG. 4 is a sectional view taken on a line IV—IV of FIG. 3.

As shown in FIG. 4, a spraying nozzle 12-A directed to a high temperature portion of mold is interconnected through a tube 14 to the branch outlet 31 of the first chamber 25, a spraying nozzle 12-B directed to a low temperature portion of mold is interconnected through the tube 14 to the outlet 32 of the second chamber 26, and a spraying nozzle 12-C directed to a portion which is apt to seize is interconnected through the tube 14 to the outlet 33 of the third chamber 27. The air nozzle 15 is interconnected through a tube 17 to the outlet 34 of the air blowing chamber 28.

It is not always necessary to use all of the outlets 31, 32, 33 and 34 of the chambers 25, 26 and 27 and the air blowing chamber 28 and outlets not being used may be plugged.

Figure 5:
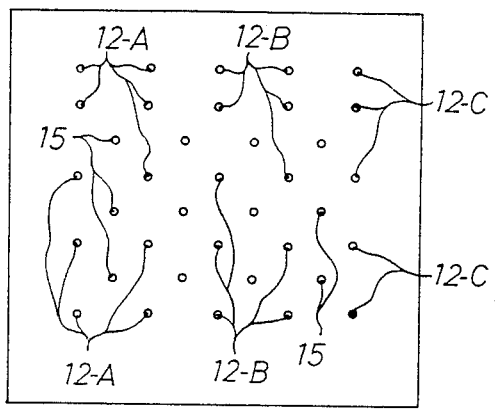
FIG. 5 is a schematic view taken in the direction of arrow V of FIG. 1.

FIG. 5 shows an embodiment of spraying nozzle arrangement, in which a number, an arrangement, a spraying direction of the nozzle tips and a spraying quantity etc. of the nozzles 12-A, 12-B and 12-C have previously been determined in accordance with a size, a configuration and a temperature difference of mold internal surface.

The spraying function will now be described. When performing a die casting work, the mixtures of mold release agents formed by the atomizers 21, 22 and 23 are delivered through chambers 25, 26 and 27 and the tubes 14 to the nozzles 12-A, 12-B and 12-C where the mixtures are sprayed at specified quantities from the nozzles toward the mold internal surfaces as shown by FIG. 1 where the nozzle unit 3 is positioned between the molds 1 and 2.

In this instance, the mold release agent for high temperature, the mold release agent for low temperature and the antiseize device (or water) are sprayed to corresponding portions of the molds respectively. Further, individual agents and device are sprayed at correct quantities and times by means of the control valves and timers. Then, air in the air blowing chamber 28 of the manifold 16 is blown from the air nozzle 15 through the tube 17 to the mold internal surface, and said blown air eliminates nonuniformity of mold release agent on the mold internal surface and removes residual water.

When the above blowing has been completed, the air cylinder 11 pulls the head 20 and the unit 3 up above the molds 1 and 2 to enable the molds 1 and 2 to be combined, thus the die casting work is performed. When the die casting work is completed, the molds are separated, the cylinder 11 pushes the head 20 and the unit 3 down to the positions of FIG. 1, and the mold release agents and the antiseize device etc. are sprayed again. The same procedure is repeated thereafter.

Figure 6:
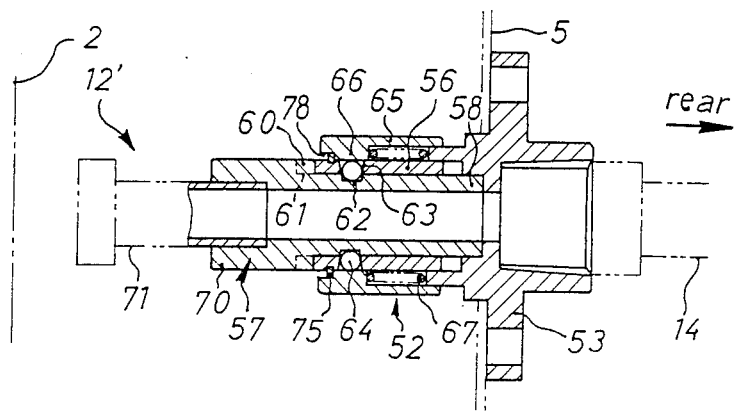
FIG. 6 is an enlarged vertical sectional view of a detachable spraying nozzle.

When specifications of product are to be changed, the molds 1 and 2 may be exchanged with other molds. Simultaneously with (or before or after) this exchange, the unit 3 is dismounted from the head 20 and transferred to a separate storing place or a readjustment site, and a new unit 3 is mounted to the head 20. The new unit 3 has previously been adjusted with spraying directions and positions of nozzles at a separate place so that no fine adjustment is required when mounting the unit. Incidentally, when dismounting the unit 3, the rod 41 is disengaged from the groove 44 of the flange 43 by rotating the lever 40 of the clamp mechanism 36 of FIG. 1 around the shaft 38 in the direction of arrow R. On the other hand, when mounting the new unit 3, the rod 41 is pulled up to be engaged with the groove 44 of the flange 43 by rotating the lever 40 in the direction opposite to arrow R. Although fixed type spraying nozzles 12 are employed in the illustrated embodiment, a freely detachable type spraying nozzle 12' as shown by FIG. 6 may also be employed. Namely, in FIG. 6, a nozzle holder 53 is fastened to the plate 5 from an internal side (opposite to the mold) of the plate 5 by means of bolts etc. Female threads are formed internally of the holder 53 and a cylindrical body 56 extending toward the mold 2 is connected thereto. A copper pipe 71 of the spraying nozzle 12' is connected to said cylindrical body 56 by a joint mechanism 52 in a detachable manner. The joint mechanism 52 will be described in detail hereunder. A socket 70 is brazed to a rear end of a copper pipe 71. An annular groove 62 is formed on an outer periphery of a rear smaller diametral part 58 of the socket 70, the outer periphery being fitted in an inner peripheral surface of the cylindrical body 56 and freely sliding in its axial direction. A locking ball 64 is adapted to engage with the annular groove 62, so that the pipe can be kept at an inserted state. A plurality of radial holes 62 are formed on the cylindrical body 56, said holes 62 being formed into a tapered shape 63 a diameter of which decreases toward the axis of socket 70, and said locking ball 64 fits in said hole 63. A knurled cylinder 65 is disposed at an external side of the cylindrical body 56 freely slidingly in its axial direction, and at the same time urged forward by a coil spring 67 and held by a stop ring 75. An annular presser part 66 is formed on an inner peripheral face of the knurled cylinder 65, the ball 64 is pressed inwardly by said annular presser part 66, thus the ball 65 being engaged with the annular groove 62. Incidentally, when such a detachable nozzle is employed, a plug (with no hole), for example, having a similar mechanism as the socket 57 may be jointed to a part of the holders 53 in place of the nozzle 12'. In case when the spraying nozzle 12' is detached, the knurled cylinder 65 is moved backward against the spring 67 and a relief part 78 is made to face opposite the ball 64. The socket 57 may then be removed forward from the cylindrical body 56 under this state. In this instance, the ball 64 moves radially outwardly into the relief part 78. Then, when another socket 57 of the spraying nozzle 12' is lugged and the knurled cylinder 65 is returned to the position as shown in FIG. 6 by the spring 67, the ball 64 is pressed inwardly by the presser part 66 and engaged with the annular groove 62, thus locking the socket 57 to the cylindrical body 56. Incidentally, it is also possible in this instance to connect the plug to the holder which has been jointed to the nozzle 12' or connect the nozzle to the holder which has been jointed to the plug. In those cases where the detachable type nozzle as shown by the embodiment of FIG. 6 is used, the work required for previously setting the nozzle number and arrangement of nozzle unit in conformity with a particular mold becomes very simple and one nozzle unit can be easily modified to work with another mold.

Figure 7:
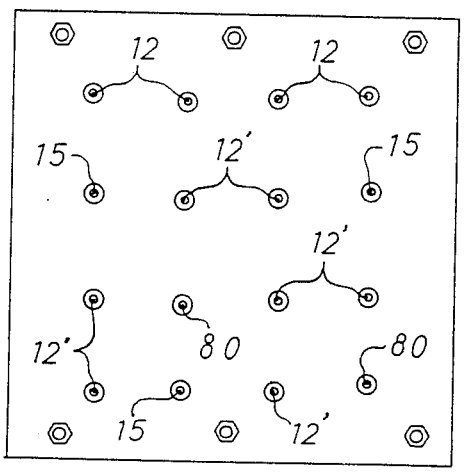
FIG. 7 is a side view of a plate showing an embodiment wherein fixed type spraying nozzles are arranged in combination with detachable type spraying nozzles.

As shown by FIG. 7, the detachable type nozzle 12' may also be arranged in combination with the fixed type nozzles 12. Further, a plug 80 may be used in place of a part of the detachable type nozzles 12'.

As described above, the present invention provides the following advantages:

(1) Many spraying nozzles 12 are held to the plate 5 and incorporated into one block as the unit 3, and the unit 3 is clamped to the base 20 having the atomizers etc. in the detachable manner. Therefore, when the mold is exchanged, the next spraying operation can be resumed by only exchanging the unit 3 having hitherto been used with another unit 3 having previously been adjusted, so that the adjusting work at site can be eliminated and simplification and shortening of the entire mold exchanging work can be accomplished.

(2) The unit 3 is provided with the plural chambers 25, 26 and 27 for mold release agent etc. and the head 20 is provided with the plural atomizers 21, 22 and 23 for mold release agent etc., so that different kinds of mold release agents can be sprayed simultaneously. Therefore, mold release agents, antiseize devices or water suitable for the temperature of each mold can be sprayed simultaneously to corresponding mold parts, respectively. Accordingly, any portion of the mold subjected to temperature difference can be securely protected from seizure, galling and entrainment of gas into the casting inside, so that product quality can be improved.

(3) Different kinds of mold release agents can be sprayed simultaneously so that the spraying time can be shortened and work efficiency can be improved.

(4) The spray system is so constructed that the comparatively expensive atomizers 21, 22, 23 are fastened to the supporting member (cylinder unit 11) and are not changed, only the unit 3 having the distribution manifold is exchanged. Therefore, the overall cost of the spray system can be reduced.

What is claimed is:

1. A spray system comprising a nozzle unit having a pair of plates facing each other, a plurality of spraying nozzles on each of said plates, a distribution manifold having a plurality of chambers, each of said chambers having at least one outlet, means mounting said plates to said distribution manifold, a plurality of tubes with each tube connecting one of said chamber outlets to one of said spraying nozzles with at least one outlet of each chamber connected to a spraying nozzle, a manifold base, a plurality of atomizers mounted on said manifold base, means providing a first mold release agent, a second mold release agent and an antiseize device or water to respective ones of said atomizers, means connecting each of said atomizers to one of said chambers, means supporting said manifold base, and means detachably securing said distribution manifold to said manifold base.

2. The spray system defined by claim 1 wherein each said spraying nozzle is a fixed type spraying nozzle fixed to one of said plates.

3. The spray system defined by claim 1 further including a plurality of nozzle holders fastened to said plates, each of said nozzle holders having an outlet connected to one of said chamber outlets by one of said tubes and said spraying nozzles are detachably connected to said nozzle holder outlets.

4. The spray system defined by claim 1 wherein said plurality of spraying nozzles comprise a combination of fixed type spraying nozzles and detachably connected spraying nozzles.

5. The spray system defined by claim 3 wherein each said nozzle holder comprises a hollow cylindrical body having a plurality of radial holes adjacent the nozzle holder outlet, a locking ball in at least one of said radial holes, a knurled cylinder slidably mounted on the outer periphery of said cylindrical body for selectively moving said locking ball radially inward, said spraying nozzle is secured to a cylindrical member having an outer peripheral annular groove, said cylindrical member is slidably received internally of said hollow cylindrical body, whereby said locking ball may be selectively moved radially inward by said knurled cylinder into engagement with said annular groove thereby detachably connecting said spraying nozzle to said nozzle holder.

6. The spray system as defined by any one of claims 1 to 5 wherein said means detachably securing said distribution manifold to said manifold base includes at least one pull clamp comprising a rotating lever and a pull rod mounted to said manifold base and means on said distribution manifold for freely engaging a bottom head of said pull rod.

* * * * *